United States Patent [19]

Miller

[11] Patent Number: 5,383,274
[45] Date of Patent: Jan. 24, 1995

[54] GARDEN SHEARS WITH DEBRIS CATCHERS

[76] Inventor: Mark D. Miller, 19075 Duck Lake Trail, Eden Prairie, Minn. 55346

[21] Appl. No.: 172,045

[22] Filed: Dec. 22, 1993

[51] Int. Cl.⁶ .............................................. B26B 13/22
[52] U.S. Cl. .......................................... 30/134; 30/131
[58] Field of Search ........................... 30/131, 134, 135; 56/241, 329

[56] References Cited

U.S. PATENT DOCUMENTS

| | | | |
|---|---|---|---|
| 108,091 | 10/1870 | Barbour | 30/134 |
| 1,151,874 | 8/1915 | Harris | 30/134 |
| 2,012,648 | 8/1935 | Wheeler | 30/134 |
| 2,337,285 | 12/1943 | Widdowson | 30/134 |
| 3,520,058 | 7/1970 | Pfaffenbach | 30/134 |
| 4,185,379 | 1/1980 | Amstutz | 30/134 |
| 4,348,808 | 9/1982 | Nalbandyan | 30/134 |
| 4,464,837 | 8/1984 | Amstutz | 30/134 |

FOREIGN PATENT DOCUMENTS

| | | | |
|---|---|---|---|
| 2832 | 10/1862 | United Kingdom | 30/131 |
| 323161 | 12/1929 | United Kingdom | 30/131 |
| 2128921 | 5/1984 | United Kingdom | 30/134 |

*Primary Examiner*—Eugenia Jones
*Attorney, Agent, or Firm*—James W. Miller

[57] ABSTRACT

A pair of garden shears is provided with a debris catcher that is attached to the back edge of each blade. Each debris catcher is transversely curved to extend over the blade and terminate in an upper edge that faces the upper edge of the other catcher. The catcher upper edges abut with one another to grip plant material therebetween and hold such plant material after it is cut by the blades. In addition, the transversely curved body of the catcher forms an upwardly facing, upwardly curved trough that is effective to catch small amounts of plant debris when the shears are being used in a vertically inclined position. The catchers are preferably molded from a plastic material and are flexible relative to one another to accommodate larger amounts of plant material.

22 Claims, 2 Drawing Sheets

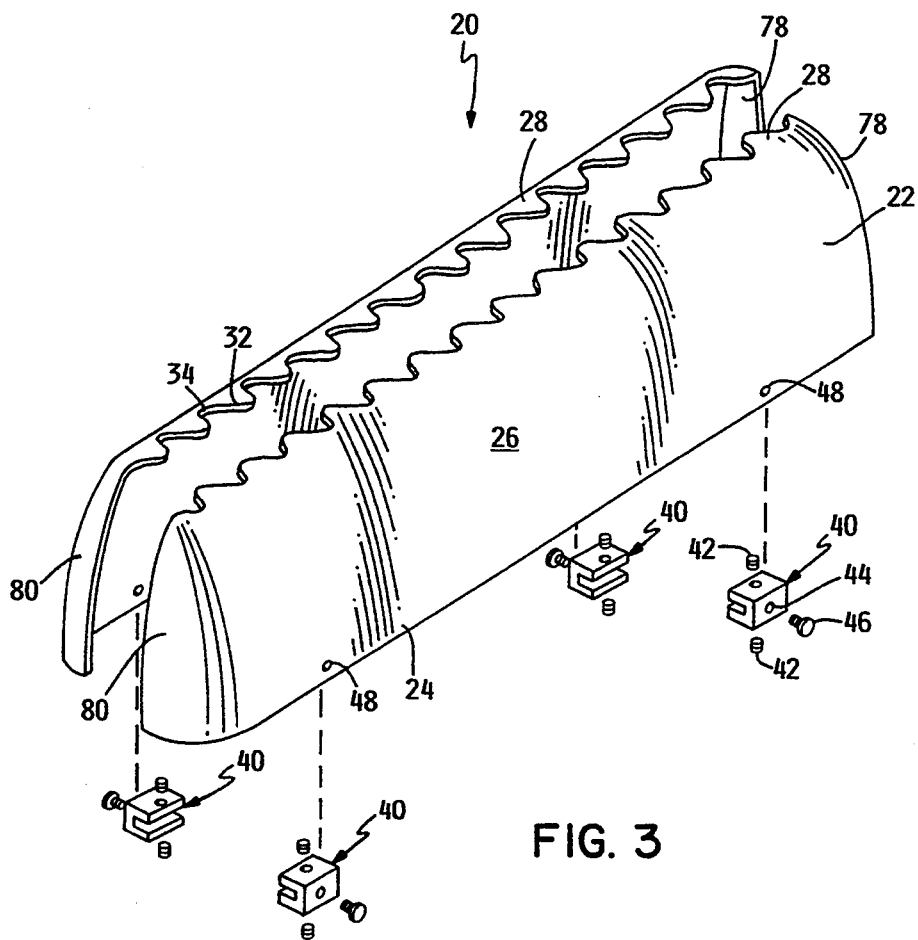
FIG. 3
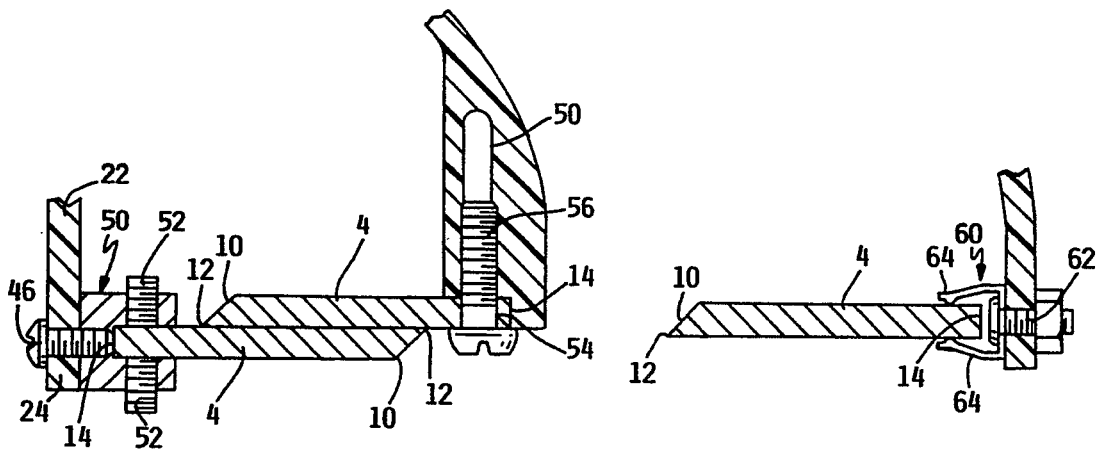
FIG. 4
FIG. 5

GARDEN SHEARS WITH DEBRIS CATCHERS

TECHNICAL FIELD

This invention relates to a pair of common garden shears having debris catchers attached to the blades which catch, retain and/or grip plant debris therein to aid in the disposal of such debris.

BACKGROUND OF THE INVENTION

Garden shears are well known implements which are used to trim and shape vegetation and plant material. For example, such shears are often used by gardeners or homeowners to trim foliage from evergreen bushes to shape the bush to a desired form, to cut branches from small trees or bushes, and the like. When using such shears, the debris material cut by the shears simply falls down into the bush or onto the ground. This requires the user to go back and pick this debris up in a final clean up step. This clean up is both time consuming and labor intensive and is obviously a disadvantage of using known garden shears.

Some prior art shears have attempted to avoid the usual clean up by providing the shears with some way of retaining the cut debris on the shears. For example, U.S. Pat. No. 2,337,285 to Widdowson discloses hedge shears having an attached cradle formed by relatively rigid posts 3 and wire strands 5. According to the Widdowson patent, "the foliage cut during the trimming of a hedge or other plants will be effectively held by the basket or cradle when the blades B are in closed relation so that such trimmings can be readily deposited in a can or other receptacle."

U.S. Pat. No. 4,464,837 to Amstutz is generally similar to Widdowson. Amstutz discloses wire members rigidly affixed to the blades of garden shears for forming a gripping device allowing the vegetation being cut to be gripped between the wire members.

While prior art devices have attempted to solve the problem by catching the debris material arising from use of the garden shears, they all have various disadvantages. For one thing, the cradle arrangement of Widdowson or the wires of Amstutz are open over much of their surface allowing small pieces of debris to simply fall through this structure without being caught or retained. Since fairly small pieces of debris often arise when the shears are being used in a vertical or inclined orientation to cut off just small amounts of material when providing a desired final shape to the sides of a bush, these prior art devices would be relatively ineffective for their stated purpose with this type of debris material.

In addition, the above noted prior art devices comprise arrangements of posts and wires that are rigidly affixed to the blades of the shears. In some cases, this is done by welding the components together and to the blades. In other cases, this is done by using bolts or the like extending through holes drilled into the blades. In any case, it is relatively difficult and expensive to manufacture and provide debris retaining means of this type on the shears. In addition, such debris retaining means is not retrofittable to existing garden shears without having to specially modify the blades of the shears in some manner.

SUMMARY OF THIS INVENTION

One aspect of this invention is to provide a pair of garden shears with debris retention means that is simple and economical to manufacture and install, and which is effective for retaining even small amounts of debris material therein as generated by the different types of trimming operations often undertaken with such shears.

These and other aspects of the invention are provided in a pair of shears of the type having a pair of cutting blades pivotally connected together, the cutting blades each having a front cutting edge with the cutting edges of the blades facing one another when the blades of the shears are opened. The cutting edges of the blades are suited for cutting material between them when the blades of the shears are closed by pivoting the blades towards one another in a shearing action. The improvement comprises debris means for retaining the material cut by the blades to aid in the disposal of such material. The debris means comprises at least one catcher secured to at least one of the blades and extending generally vertically upwardly to an upper face of the blade, the catcher being shaped to form an upwardly facing trough for catching relatively small amounts of material being cut by the blades when such catcher is attached to the lowest blade in a vertically inclined pair of shears such that the cut material falls by gravity into the trough forming portion of the catcher.

BRIEF DESCRIPTION OF THE DRAWINGS

This invention will be described more completely in the following Detailed Description, when taken in conjunction with the following drawings, in which like reference numerals refer to like elements throughout.

FIG. 3 is an exploded perspective view of one embodiment of the debris catchers that are used in conjunction with the garden shears shown in FIG. 1, particularly illustrating a first attachment system for securing the debris catchers to the blades of the shears;

FIG. 4 is an enlarged cross-sectional view of the improved garden shears of this invention, with the left or lowest blade showing the first attachment system shown in FIG. 3 and the right or upper blade showing a second attachment system for securing the debris catchers to the blades which second attachment system is an alternative to the first attachment system; and FIG. 5 is an enlarged cross-sectional view of one blade of the improved garden shears according to this invention, particularly illustrating a third attachment system for securing the debris catchers to the blades of the shears.

DERAILED DESCRIPTION

Figure 1:
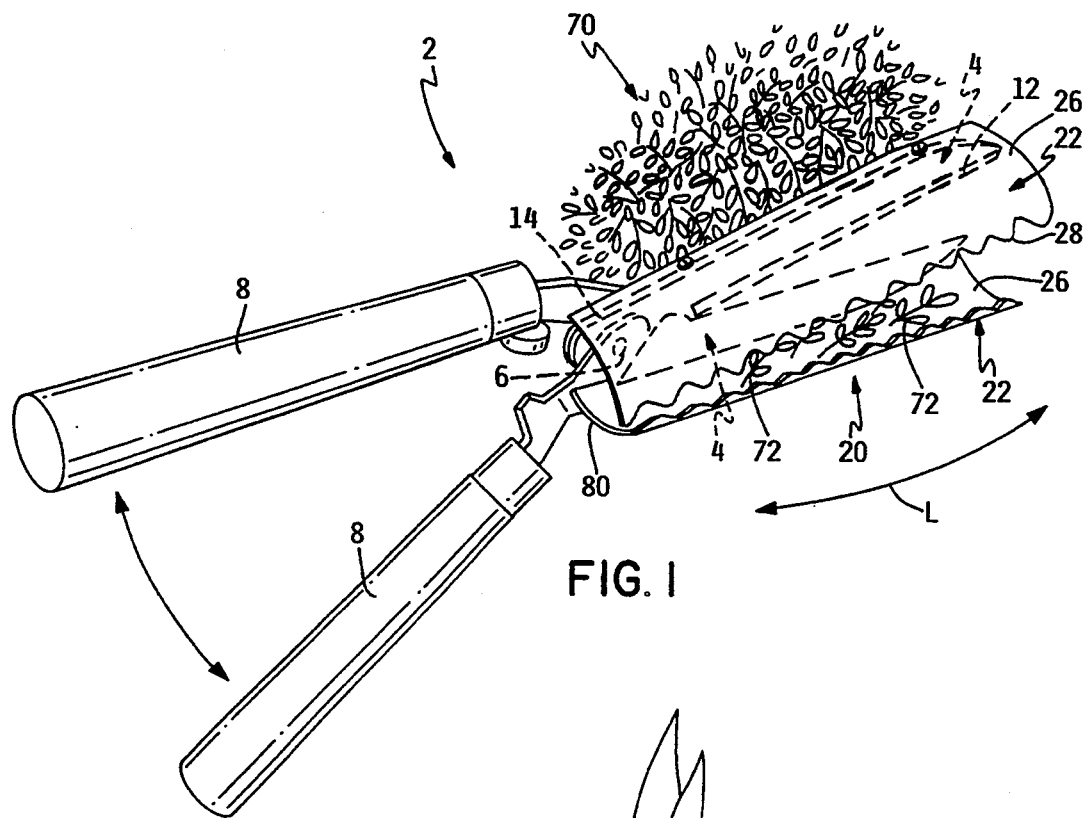
FIG. 1 is a perspective view of an improved pair of garden shears according to this invention, particularly illustrating the shears oriented generally vertically to trim relatively small pieces of vegetation from the side of a bush or hedge with the plant debris falling downwardly to be caught and retained on the debris catcher located on the lowest blade.
Figure 2:
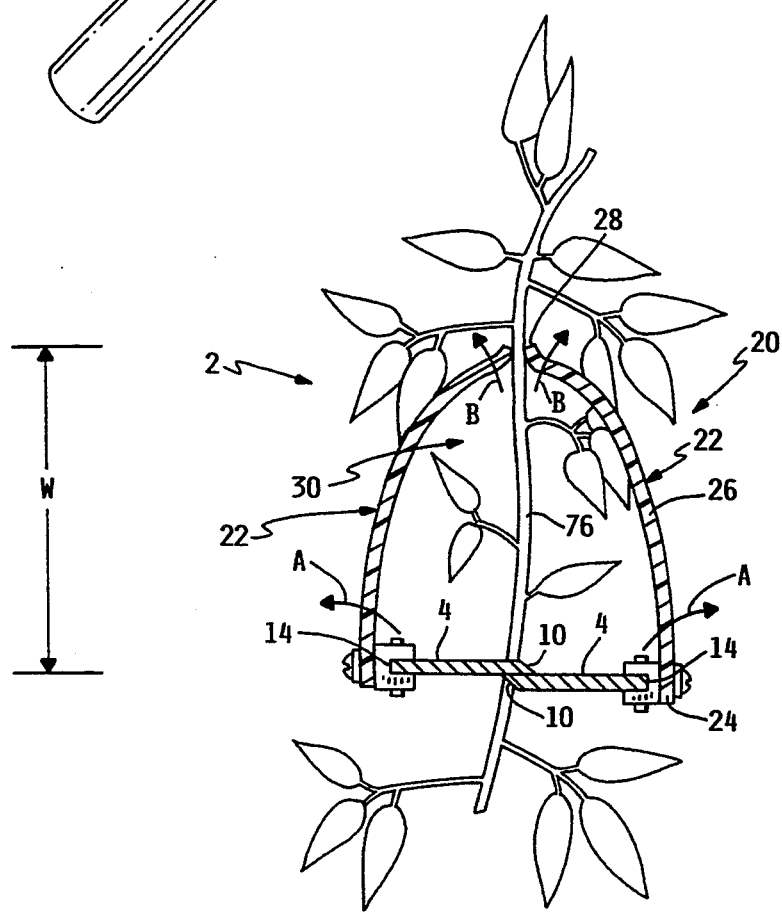
FIG. 2 is a cross-sectional view of the improved garden shears of FIG. 1, particularly illustrating the shears being used in a generally horizontal orientation to clip a branch from a bush or tree with the branch being gripped or clamped between the opposed debris catchers attached to the opposed blades of the shears.

This invention relates to an improved pair of garden shears generally illustrated as 2 in FIGS. 1 and 2. Shears 2 are designed to be manually operated by the user to trim ground growing vegetation or similar plant material. For example, shears 2 can be used to trim and shape the sides and tops of evergreen hedges or bushes, to cut and trim branches or the like from small trees and bushes, etc.

By way of background, shears 2 comprise a pair of blades 4 that are pivotally connected together by a pivot pin 6. Blades 4 are substantially identical to one another and are opposed to one another when such blades are assembled together to form a completed pair of shears 2. Each blade 4 includes a rearwardly extending handle 8. The user manipulates handles 8 by opening and closing handles 8 relative to one another to open and close blades 4 in the well known action of a pair of scissors or shears.

Each blade 4 includes a front, cutting edge 10 that has a sharpened cutting surface 12 along most of its length. Cutting surface 12 extends from a spot closely adjacent the tip of blade 4 to a point relatively close to pivot pin 6. Each blade 4 further includes a back, non-cutting edge 14 which is spaced from front edge 10 of blade 4 by the width of blade 4. Blade 4 generally has a slightly tapering width as one proceeds forwardly from pivot pin 6 towards the tip of blade 4. As one reaches the tip of blade 4, back edge 14 of each blade 4 becomes significantly curved or rounded to allow the front and back edges 10 and 14 of blade 4 to meet to form the blade tip.

Garden shears 2 as described to this point are intended to be representative of the types of common garden shears that have been widely known and used for many years. This invention does not relate to such shears 2 per se, but to an improved pair of such shears 2 having debris means for catching, retaining and/or gripping plant debris therein to aid in the disposal of such debris. This debris means is generally illustrated as 20 in FIGS. 1 and 2. The improved shears 2 of this invention, namely shears 2 equipped with such debris means 20, have a number of advantages over prior art shears, as will be described hereafter.

Referring now to FIGS. 1 and 2, debris means 20 according to this invention comprises first and second debris catchers 22 that are attached respectively to opposed blades 4 of shears 2. Preferably, each debris catcher 22 is formed from a shield-like, generally imperforate, solid piece of a relatively thin plastic material, e.g. from polyethylene plastic material approximately one-sixteenth of an inch thick or so. This allows each catcher 22 to be capable of being bent or of flexing without cracking or otherwise being damaged.

Each catcher 22 has a length generally corresponding to the length of blades 4 such that blades 4 are substantially enclosed within catchers 22. Each catcher also has a relatively substantial width which is shown as w in FIG. 2. As shown in FIG. 2, the width w of each catcher preferably substantially exceeds the width of blades 4, and is preferably approximately one and a half to three times greater than the width of blades 4. For blades that are approximately 1.25 inches wide at their widest point, a catcher 22 having a width w of approximately 2.5 inches has been used by the Applicant.

Each debris catcher 22 is desirably fixed to one blade 4 in any suitable fashion to be movable therewith. Preferably, the attachment system is one in which a lower edge 24 of each catcher 22 is attached to the back edge 14 of one blade 4. This can be done in various ways as will be described hereafter.

Nonetheless, when so attached to each blade 4, each catcher 22 will extend upwardly from blade 4 at generally right angles relative thereto. Preferably, each debris catcher 22 is formed to have a central, transversely curved portion 26 which is transversely curved over blades 4 to terminate in an upper edge 28 that is generally aligned with, but spaced above, the front cutting edge 10 of each blade 4. The upper edges 28 of the respective catchers 22 will thus face one another, and will be in an abutting relationship with one another, when blades 4 of shears 2 are closed relative to one another. Thus, catchers 22 form a generally enclosed chamber 30 located above blades 4 when blades 4 are closed and upper edges 28 are abutted with one another.

Referring now to FIG. 3, upper edges 28 of catchers 22 are also preferably serrated or corrugated with the corrugations comprising a series of rounded ridges 32 which are separated by a series of rounded grooves 34. The corrugations on one catcher 22 are longitudinally offset relative to the corrugations on the other catcher. Thus, ridges 32 on one catcher will interfit with or nest in grooves 34 on the other catcher 22 when upper edges 28 abut against one another.

A first attachment system for securing catchers 22 to blades 4 is shown in FIGS. 1-3 and on the lowest or left blade in FIG. 4. This attachment system is one that can be used to retrofit debris means 20 to a pair of existing garden shears 2 without having to modify such shears in any way.

The first attachment system comprises a plurality of U-shaped mounting blocks 40 that fit around back edge 14 of a blade 4. Each mounting block 40 is fixed in place on blade 4 by two hardened set screws 42 which extend down through mounting block 40 to bear against the upper and lower faces of blade 4 proximate to back edge 14. Set screws 42 when tightened will securely affix each mounting block 40 to blades 4. Preferably, two mounting blocks 40 are used on each blade 4 spaced along the length of blade 4 with one mounting block 40 being used near the tip of blade 4 and the other mounting block 40 being used near the rear portion of blade 4 generally adjacent pivot pin 6.

With mounting blocks 40 first fixed to blades 4 in this manner, catchers 22 can then, in turn, be affixed to mounting blocks 40. Each mounting block 40 includes a threaded bore 44 in the rear face thereof, i.e. in the closed end of the U-shaped block 40. This bore 44 will be aligned with back edge 14 of blade 4 when block 40 is slipped onto back edge 14 of blade 4. A machine screw 46 or the like will then be used to extend through a mounting hole 48 in the lower edge 24 of each catcher 22 with two mounting holes 48 being spaced along lower edge 24 corresponding to the longitudinal spacing of blocks 40 along the length of blade 4. Screw 46 can then be received and tightened in threaded bore 44 in the rear face of mounting block 40 to clamp catcher 22 to the adjacent block 40. Thus, with mounting blocks 40 clamped in place on back edge 14 of the garden shear blades, catchers 22 can then be clamped to mounting blocks 40 to secure catchers 22 to blades 4 without having to drill mounting holes into blades 4 or to otherwise modify blades 4 themselves.

Other attachment systems could obviously be used in place of this attachment system. For example, referring to the right, upper blade in FIG. 4, the lower edge of each catcher could be formed with one or more downwardly facing, internally threaded apertures 50. For example, such apertures 50 could be provided by a screw boss that is integrally molded into plastic catcher 22. Blades 4 of shears 2 would have to be drilled or otherwise formed to have circular holes 54 placed along the length thereof in positions which would mate with the positions of threaded apertures 50. A machine screw 56 could then be used extending upwardly through blades 4, with the shank of each screw 56 extending through one hole 54, to be threadedly received in aperture 50.

Referring now to FIG. 5, yet another alternative attachment system is disclosed. Each catcher could be provided with a plurality of spring clips 60 on its lower edge 24 which clips 60 are secured to catcher 22 by a mounting bolt 62. Spring clip 60 would have opposed spring arms 64 that are biased together with sufficient force to securely grip onto the upper and lower faces of blade 4 when the back edge 14 of blade 4 is forced between such arms 64. Such a spring clip attachment system, like the mounting block attachment system, could be used on blades 4 of an existing pair of shears 2 without having to drill holes in or otherwise modify blades 4 and without having a catcher 22 specially formed with threaded apertures 50.

Thus, while different means could be used to attach debris catchers 22 to blades 4, as just described, it is preferred that such catchers be attached at spaced points to back edge 14 of each blade. In conjunction with the width w of catcher 22 and with the flexible nature of the catcher material itself, this attachment system allows a great deal of catcher flexing should that be necessary to accommodate a large mass of debris material between catchers 22. For example, flexing of each catcher 22 away from the other catcher 22 is generally facilitated because the entire catcher can flex about the line of attachment to back edge 14 of blades 4, i.e. about back edge 14 of blades 4. This flexing action is shown in FIG. 2 by the arrows A. In addition, because catchers 22 themselves are flexible by virtue of being made of a thin, flexible plastic material, catchers 22 can also exhibit localized flexing adjacent their upper edges 28 or elsewhere. This localized flexing is shown in FIG. 2 by the arrows B.

A pair of garden shears 2 equipped with the debris means of this invention will prevent debris material that has been severed by blades 4 from simply falling onto the ground. It accomplishes this in a couple of different ways depending upon the manner of usage of shears 2. This will be described in conjunction with the different uses of shears 2 as shown in FIGS. 1 and 2.

Referring first to FIG. 1, a vertical trimming operation for a hedge or bush 70 is shown in which relatively small amounts of material are being trimmed off the sides of the hedge or bush 70 to trim and shape the hedge or bush 70. For example, various evergreen bushes, known as arborvitae bushes, are used to provide a conical, Christmas tree like form, with the external surface of such bushes 70 comprising evergreen foliage in a relatively close packed mass. In trimming such a bush 70, the user often orients shears 2 generally vertically, or at least vertically inclined along the inclined line that defines the intended conical shape of the bush, with the result that one blade 4 is vertically located above the other blade 4. The user then simply holds shears 2 in this orientation and repeatedly moves the handles back and forth using a relatively small motion while shears 2 are simultaneously moved along the desired conical line of bush 70.

Such a trimming operation results in many small pieces 72 of evergreen foliage being cut. These individual pieces 72 may be anywhere from as little as a quarter inch or so up to a few inches in length. When using conventional shears 2 without the debris means 30 of this invention, such pieces 72 simply fall into bush 70 or onto the ground. The user than has to go back and attempt to pick these pieces up after the bush is completely trimmed, which can be both difficult and time consuming to do.

However, the improved shears 2 of this invention can be used to collect the debris pieces 72 during the trimming operation without such pieces falling onto the ground. In using shears 2 in the manner shown in FIG. 1, the transversely curved section 26 of lowest catcher 22, i.e. catcher 22 on the lowest blade 4, forms an upwardly facing, upwardly curved trough or catch basin which is quite effective to catch and retain this debris. In fact, when small debris pieces 72 of foliage are being trimmed off bush 70 in this manner, the width w of catcher 22 relative to blade 4 will allow quite a number of small pieces 72 to collect on catcher 22. Thus, if the user keeps shears 2 in the inclined or vertical orientation shown in FIG. 1 while he or she trims and shapes the sides of bush 70, he or she can simply keep cutting over quite a number of cutting strokes, e.g. over five or six or seven strokes or more, with the debris pieces 72 from each stroke simply falling down onto lowest catcher 22 to be retained thereon with the pieces 72 from previous strokes.

When a sufficient amount of material has been collected on lowest catcher 22 such that catcher 22 is substantially loaded with debris material, the user can then simply keep blades 4 closed after the last cut. Shears 2 can then be moved over a garbage or waste receptacle. If shears 2 are then pointed down into the receptacle and blades 4 are fully opened, the vegetation clippings or pieces 72 that were collected on the lowest catcher 4 will simply fall down into the receptacle. Thus, using shears 2 equipped with debris catchers 22, there is no need to go back later and attempt to retrieve or clean these debris pieces 72 from bush 70 or the ground. The time and labor saving advantages of this are apparent.

It is preferred that blades 4 of shears 2 be equipped with two opposed catchers 22 as shown herein to equally allow right or left handed operation in the vertical trimming operation shown in FIG. 1. Regardless of which blade 4 is up or down, one shield 22 will always be attached to the lowest blade 4 to catch debris pieces 72 as shown in FIG. 1. In addition, using two opposed debris catchers 22 will facilitate a debris gripping action between catchers 22 as will be described hereafter.

However, this invention contemplates that different sets of shears 2 could be sold for either right handed or left handed operation. In this event, only one catcher 22 would necessarily have to be provided with that catcher attached to whichever blade 4 would be the lowest blade when shears 2 are used in a right handed or left handed operation. Thus, a first set of shears 2 could be sold for right handed operation with one catcher 22 attached to one of the blades 4 (i.e. the right blade 4), and a second set of shears 2 could be sold for left handed operation with one catcher attached to the other of the blades 4 (i.e. the left blade 4).

A pair of shears 2 equipped with novel debris means 20 of this invention, namely when equipped with the preferred arrangement of two opposed debris catchers 22, is also useful when horizontally trimming the branches of bushes or the like. In this operation, shears 2 are held in a generally horizontal or non-inclined position, as shown in FIG. 2., relative to the item being cut. In this type of orientation, shears 2 can be closed around the trunk 76 of a branch or section of the plant being trimmed. The trunk 76 can extend upwardly through and past catchers 22 if trunk 76 has an extended length. When trunk 76 is cut by blades 4 of shears 2, the corrugated and abutting upper edges 28 of catchers 22 will grip against trunk 76 to retain and hold it in place. Again, the severed portion of trunk 76, and any other branches or materials contained on trunk 76 or that might fall from trunk 76, will be gripped between catchers 22 or will be retained in the enclosed chamber 30 formed by catchers 22 until shears 2 are moved over a waste receptacle or other disposal site. These materials can then be easily released from shears 2 if blades 4 are now opened, allowing such materials to simply fall into the waste receptacle or onto the disposal site.

In cutting plant material in the fashion shown in FIG. 2, the flexible nature of catchers 22 is advantageous. For a trunk 76 that is somewhat small, the facing edges of catchers 22 and the material adjacent thereto can locally flex or bend to accommodate trunk 76 as shown by the arrows B in FIG. 2. However, if trunk 76 is much thicker than that shown, it can still be held within catchers 22 as catchers 22 themselves can flex outwardly about the back edges 14 of blades 4. See the flexing action denoted by the arrows A in FIG. 2. Thus, catchers 22 can accommodate and grip widely varying sizes of trunks 76 and widely varying masses of material can be retained in chamber 30 located between catchers 22.

As noted earlier, each catcher is transversely curved over blade 4 as shown in FIG. 2 by curved section 26 of catchers 22. This allows the upper edges 28 of catchers 22 to abut with one another when the lower edges 28 of catchers 22 are affixed to back edges 14 of blades 14 and provides an upwardly facing, upwardly curved trough on lowest blade 14 when shears 2 are used in the manner shown in FIG. 1.

In addition to this transverse curve in catchers 22, it is also preferred that catchers 22 be longitudinally curved, at least slightly. as they extend along the length of blades 4. This longitudinal curvature is illustrated by the arrow L in FIG. 1. This provides a compound curvature in catchers 22—namely catchers 22 are both curved longitudinally from front to back as they extend along the length of blades 4 and are also transversely curved between their lower and upper edges 24 and 28 as they extend perpendicularly away from blades 4. This compound curvature further facilitates use of catchers 22 to form a trough or catch basin for retaining small sized debris pieces 72 when shears 2 are used in the manner shown in FIGS. 1. The slight longitudinal curvature provided in catchers 22 prevents without such debris pieces from falling off the front end 78 or back end 80 of lowest catcher 22.

As shown in FIG. 1, catchers 22 are preferably provided with a compound curvature in the manner just described, but their front and back ends do not completely come together to be closed in the manner of the abutting upper edges 28. Note the open space shown in FIG. 1 between the back ends 80 of the respective catchers. Thus, the front and back ends of these catchers could be relatively open as shown in FIG. 1. Nonetheless, with a longitudinal curvature provided in catchers 22 as just described, the front and back ends of the lowermost catcher will be slightly upturned and will adequately hold debris pieces 72 cut by shears 2 in the FIG. 1 orientation.

However, referring now to FIG. 3, a preferred version of shears 2 of this invention will include front and back ends 78 and 80 on each end of catcher 22 that are relatively steeply curved inwardly. Thus, the curved ends 78 on the front of catchers 22, and the curved ends 80 on the back of catchers 22, will abut together in much the same manner as the mating upper edges 28 of catchers 22 when catchers 22 are brought together by closing blades 4. Thus, such steeply curved or cupped front and rear ends 78 and 80 of catchers 22 will even better retain small debris pieces 72 on the lowest catcher. In addition, the enclosed debris containing chamber 30 formed by catchers 22 above blades 4 will now be completely enclosed when catchers 22 abut with one another along the entire length thereof including over the front and back ends 78 and 80 of catchers 22.

One convenient method of providing the longitudinal curvature described above for catchers 22 is to simply attach catchers 22 to back edge 14 of blades 4 when such a back edge 14 tapers or curves relative to front edge 10. However, a longitudinal curvature could be preformed into catchers 22, in the same manner that the transverse curvature is preformed or molded into catchers 22, to be provided regardless of the shape of back edge 14 of blades 4. In addition, the lower edge 24 of catchers 22 could be L-shaped when attached to the back edge 14 of blades 14, such that the beginning of the transversely curved section 26 is offset rearwardly from back edge 14 of blade 14. Such a configuration could be used when it is desired to enlarge the size of chamber 30 to enhance its debris carrying capacity.

Various modifications of this invention will be apparent to those skilled in the art. For example, while catchers 22 have been described herein as being generally imperforate and solid, the degree to which they are imperforate is in proportion to the size of the materials which are desirably retained on catchers 22. Catchers 22 could be made of a porous, screen like material as long as the pores in such material are too small to allow debris pieces 72 of the size customarily cut by shears 2 to fall through. In addition, while debris catchers 22 have been shown for use with garden shears 2 for trimming ground growing vegetation and plant material, such catchers are not limited for use with garden shears but could be used with scissors or shears intended for cutting other things. Accordingly, this invention is to be limited only by the appended claims.

I claim:

1. An improved pair of shears having a pair of cutting blades pivotally connected together, the cutting blades each having a front cutting edge with the cutting edges of the blades facing one another when the blades of the shears are opened, the cutting edges of the blades suited for cutting material between them when the blades of the shears are closed by pivoting the blades towards one another in a shearing action, the cutting blades each having a back, non-cutting edge with the back edges of the blades facing away from one another, the improvement comprising:

a pair of debris catchers that are attached to the blades with each debris catcher being attached to a respective one of the blades, wherein each debris catcher comprises a substantially imperforate piece of relatively thin sheet material which is attached to its respective blade along a lower edge thereof with each catcher extending generally vertically upwardly relative to an upper face of its respective blade to terminate in an upper edge located above the upper face of its respective blade, wherein each catcher has a transversely troughed shape relative to its respective blade between the lower and upper edges of the catcher to extend inwardly over its respective blade from the lower edge of the catcher towards the front edge of its respective blade, and wherein the piece of sheet material that forms each catcher has a downwardly facing, innermost face extending from the lower edge of the catcher to the upper edge of the catcher with said innermost face being spaced above and out of contact with the upper face of its respective blade to form a downwardly facing chamber beneath the innermost face of the catcher wherein said chamber is located above the upper face of its respective blade.

2. The shears of claim 1, wherein the debris catchers are each attached to the back edge of its respective blade.

3. The shears of claim 1, wherein the upper edges of the respective catchers lie generally proximate to one another and face one another when the blades of the shears are closed together.

4. The shears of claim 3, wherein the upper edges of the debris catchers abut with one another in a mating face-to-face engagement when the blades of the shears are closed together.

5. The shears of claim 4, wherein the abutting upper edges of the catchers are corrugated with the corrugations on the respective catchers interfitting or nesting with one another when the catcher upper edges are abutted together.

6. The shears of claim 4, wherein each catcher is transversely curved between the upper and lower edges thereof with the transverse curvature comprising the transversely troughed shape of each catcher.

7. The shears of claim 6, wherein each catcher has spaced front and back ends, and wherein each catcher is longitudinally curved between its front and back ends such that the catcher has a compound curvature comprising the transversely troughed shape of the catcher.

8. The shears of claim 7, wherein the front and back ends of the catchers are shaped to also abut with one another when the blades of the shears are closed together such that the chamber located above the blades is completely enclosed.

9. The shears of claim 1, wherein each catcher is integrally molded out of a plastic material that is sufficiently thin such that the sheet of plastic material forming the catcher can bend or flex locally relative to the other catcher around any relatively thick debris which is gripped between the upper edges of the catchers.

10. The shears of claim 9, further including means for attaching the lower edge of each catcher to its respective blade to permit bending or flexing of the entire catcher about the lower edge thereof.

11. The shears of claim 1, further including means for attaching the lower edge of each catcher to its respective blade to permit bending or flexing of the entire catcher about the lower edge thereof.

12. The shears of claim 11, wherein the lower edge of each catcher is attached by the attaching means to its respective blade at a plurality of discrete, widely spaced points along the lower edge.

13. The shears of claim 12, wherein the lower edge of each catcher is attached by the attaching means to the back edge of its respective blade.

14. The shears of claim 1, wherein the upper edge of each catcher is spaced above the upper face of its respective blade by a distance which substantially exceeds a maximum width of its respective blade between the front and back edges of its respective blade.

15. The shears of claim 14, wherein the upper edge of each catcher is spaced above the upper face of its respective blade by a distance which is approximately one and a half to three times greater than the maximum width of its respective blade between the front and back edges of its respective blade.

16. The shears of claim 1, wherein each catcher is transversely curved between the upper and lower edges thereof with the transverse curvature comprising the transversely troughed shape of each catcher.

17. An improved pair of shears having a pair of cutting blades pivotally connected together, the cutting blades each having a predetermined width and length, the cutting blades each having a front cutting edge with the cutting edges of the blades facing one another when the blades of the shears are opened, the cutting edges of the blades suited for cutting material between them when the blades of the shears are closed by pivoting the blades towards one another in a shearing action, the cutting blades each having a back, non-cutting edge with the back edges of the blades facing away from one another the improvement comprising:

two debris catchers carried on the blades with each catcher being carried on a respective one of the blades, each catcher having a downwardly facing, substantially imperforate innermost face extending from a lower edge of the catcher to an upper edge of the catcher with the innermost catcher face being spaced above and out of contact with an upper face of its respective blade and the upper edges of the catchers abutting with one another when the blades of the shears are closed for forming a downwardly facing, generally enclosed chamber located above and spanning over a major portion of the width and length of the blades when the blades of the shears are closed for retaining material cut by the blades in said chamber.

18. The shears of claim 17, wherein the catchers are flexible relative to one another to allow the size of the chamber to expand or to allow the catchers to part from one another to accommodate larger or longer amounts of cut materials, respectively.

19. The shears of claim 17, wherein the upper edge of each catcher is spaced above the upper face of its respective blade by a distance which substantially exceeds a maximum width of its respective blade between the front and back edges of its respective blade.

20. An improved pair of shears having a pair of cutting blades pivotally connected together, the cutting blades each having a front cutting edge with the cutting edges of the blades facing one another when the blades of the shears are opened, the cutting edges of the blades suited for cutting material between them when the blades of the shears are closed by pivoting the blades towards one another in a shearing action, the cutting blades each having a back, non-cutting edge with the back edges of the blades facing away from one another, the improvement comprising:

a pair of debris catchers that are attached to the blades with each debris catcher being attached to a respective one of the blades, wherein each debris catcher is attached to its respective blade along a lower edge thereof with each catcher extending generally vertically upwardly relative to an upper face of its respective blade to terminate in an upper edge located above the upper face of its respective blade, wherein each catcher is transversely troughed relative to its respective blade to extend inwardly over its respective blade towards the front edge of its respective blade, and further including means for attaching the lower edge of each catcher to its respective blade to permit bending or flexing of each catcher about the lower edge thereof.

21. The shears of claim 20, wherein the upper edge of each catcher is spaced above the upper face of its respective blade by a distance which substantially exceeds a maximum width of its respective blade between the front and back edges of its respective blade.

22. An improved pair of shears having a pair of cutting blades pivotally connected together, the cutting blades each having a front cutting edge with the cutting edges of the blades facing one another when the blades of the shears are opened, the cutting edges of the blades suited for cutting material between them when the blades of the shears are closed by pivoting the blades towards one another in a shearing action, the cutting blades each having a back, non-cutting edge with the back edges of the blades facing away from one another, the improvement comprising:

a pair of debris catchers that are attached to the blades with each debris catcher being attached to a respective one of the blades, wherein each debris catcher comprises a substantially imperforate piece of relatively thin sheet material which is attached to its respective blade with each catcher extending generally vertically upwardly relative to an upper face of its respective blade to terminate in an upper edge located above the upper face of its respective blade, wherein each catcher has a transversely troughed shape relative to its respective blade to extend inwardly over its respective blade from the attachment of the catcher to its respective blade towards the front edge of its respective blade, wherein the upper edges of the debris catchers abut with one another in a mating face-to-face engagement when the blades of the shears are closed together, and wherein the upper edge of each catcher is spaced above the upper face of its respective blade by a distance which substantially exceeds a maximum width of its respective blade between the front and back edges of its respective blade.

* * * * *